United States Patent
Ou-Yang et al.

(10) Patent No.: US 11,204,265 B2
(45) Date of Patent: Dec. 21, 2021

(54) ROTARY CODING DISC AND METHOD FOR DESIGNING THE SAME

(71) Applicant: NATIONAL CHIAO TUNG UNIVERSITY, Hsinchu (TW)

(72) Inventors: Mang Ou-Yang, Hsinchu (TW); Ting-Feng Wang, Tainan (TW); Yung-Jhe Yan, Taipei (TW); Chun-Chieh Liao, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 16/943,071

(22) Filed: Jul. 30, 2020

(65) Prior Publication Data

US 2021/0341313 A1 Nov. 4, 2021

(30) Foreign Application Priority Data

Apr. 30, 2020 (TW) .................. 109114534

(51) Int. Cl.
*G01D 5/34* (2006.01)
*G01D 5/347* (2006.01)
(Continued)

(52) U.S. Cl.
CPC ....... *G01D 5/34792* (2013.01); *G01D 5/2455* (2013.01); *G01D 5/2497* (2013.01); *G01D 5/3473* (2013.01)

(58) Field of Classification Search
CPC ............. G01D 5/34792; G01D 5/3473; G01D 5/2497; G01D 5/2455
See application file for complete search history.

(56) References Cited

U.S. PATENT DOCUMENTS

| 9,423,281 | B2 | 8/2016 | Agrawal et al. |
| 10,222,242 | B2 | 3/2019 | Van De Kerkhof |
| 2019/0317315 | A1* | 10/2019 | Wang ................. G01D 5/34746 |

OTHER PUBLICATIONS

Das, et al., "Design of an Absolute Shaft Encoder Using Optically Modulated Binary Code," IEEE Sensor J., vol. 18 No. 12, pp. 4902-4910 (Jun. 2018).

(Continued)

*Primary Examiner* — Tony Ko
(74) *Attorney, Agent, or Firm* — Rosenberg, Klein & Lee

(57) ABSTRACT

A rotary coding disc and a method for designing the same is applied to an optical encoder. N-bit De Bruijn sequences include 1 and 0. The N-bit De Bruijn sequence has the maximum binary code and the minimum binary code. When a binary code having M bits is located between the maximum binary code and the minimum binary code, the corresponding N-bit De Bruijn sequences are selected as diagonal De Bruijn sequences, wherein $$\frac{2^N - 2N}{2} - \frac{N}{2} < M < \frac{2^N - 2N}{2} + \frac{N}{2}.$$

The De Bruijn sequence may be converted into a De Bruijn energy level. The total number of 1 consecutively neighboring 0 and (N−1) consecutively neighboring N of the De Bruijn energy level is calculated. The transparent areas and the opaque areas are located based on the De Bruijn sequence or the De Bruijn energy level that corresponds to the total number less than or equal to N.

10 Claims, 15 Drawing Sheets

(51) Int. Cl.
  *G01D 5/249* (2006.01)
  *G01D 5/245* (2006.01)

(56) References Cited

OTHER PUBLICATIONS

Wang, et al., "Coding Optimization for the Absolute Optical Rotary Encoder," presented at Int'l Automatic Control Conf., Taoyuan, Taiwan (Nov. 4-7, 2018).

* cited by examiner

| position | B(2,9) one of nine-bit De Bruijn sequences | | | | |
|---|---|---|---|---|---|
| 1~45 | 000000000 | 100001000 | 100000100 | 100100000 | 010100100 |
| 46~90 | 010100010 | 010100001 | 010100101 | 010100000 | 001101000 |
| 91~135 | 001100100 | 001100010 | 001101010 | 001100001 | 001101001 |
| 136~180 | 001100101 | 001100011 | 001100000 | 101101000 | 101100100 |
| 181~225 | 101100010 | 101101010 | 101100110 | 101100001 | 101101001 |
| 226~270 | 101100101 | 101101100 | 000011101 | 000011100 | 100011101 |
| 271~315 | 100011100 | 010011101 | 010011100 | 110011100 | 001011101 |
| 316~360 | 001011100 | 101011101 | 101011100 | 011011101 | 011011100 |
| 361~405 | 111011100 | 000111101 | 000111100 | 100111101 | 100111100 |
| 406~450 | 010111101 | 010111100 | 110111101 | 110111100 | 001111101 |
| 451~495 | 001111100 | 101111101 | 101111100 | 011111101 | 011111100 |
| 496~512 | | 111111101 | 111111111(0) | | |

Fig. 4 (prior art)

| position | B(2,9) one of nine-bit De Bruijn sequences | | | | |
|---|---|---|---|---|---|
| 1~45 | 000000000 | 111001111 | 100000001 | 010011011 | 101001110 |
| 46~90 | 100001111 | 011111010 | 001100111 | 101010011 | 110011011 |
| 91~135 | 000000100 | 010010100 | 011100001 | 110110001 | 110101010 |
| 136~180 | 010011010 | 110101011 | 111001110 | 111100100 | 001011010 |
| 181~225 | 001010000 | 100110011 | 010000001 | 101001100 | 011010100 |
| 226~270 | 010001111 | 101101101 | 001000110 | 110111111 | 111000110 |
| 271~315 | 000011111 | 110101100 | 100010110 | 001011110 | 000100000 |
| 316~360 | 101110011 | 000010101 | 100001100 | 100111111 | 011101101 |
| 361~405 | 011100011 | 110001001 | 110001010 | 101011011 | 001010010 |
| 406~450 | 101000001 | 100010000 | 110111101 | 001011101 | 011110110 |
| 451~495 | 011001011 | 111100101 | 100111001 | 010111011 | 100000100 |
| 496~512 | 100101101 | 11001001(0) | | | |

Fig. 8

|    | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| 1  | 0 | 0 | 0 | 0 | 0 | 1 | 0 | 0 | 0 | 1 | 1 | 0 | 1 | 1 | 0 | 0 | 1 | 1 | 1 | 1 | 0 | 1 | 0 | 0 | 1 | 0 | 1 | 0 | 1 | 1 |
| 2  | 0 | 0 | 0 | 0 | 0 | 1 | 0 | 0 | 0 | 1 | 1 | 0 | 1 | 1 | 0 | 0 | 1 | 1 | 1 | 1 | 0 | 1 | 0 | 1 | 0 | 0 | 1 | 0 | 1 | 1 |
| 3  | 0 | 0 | 0 | 0 | 0 | 1 | 0 | 0 | 0 | 1 | 1 | 1 | 0 | 0 | 1 | 0 | 1 | 1 | 1 | 1 | 0 | 1 | 0 | 1 | 0 | 0 | 1 | 1 | 0 | 1 |
| 4  | 0 | 0 | 0 | 0 | 0 | 1 | 0 | 0 | 0 | 1 | 1 | 1 | 0 | 0 | 1 | 0 | 1 | 1 | 1 | 1 | 0 | 1 | 1 | 0 | 1 | 0 | 1 | 0 | 0 | 1 |
| 5  | 0 | 0 | 0 | 0 | 0 | 1 | 0 | 0 | 1 | 0 | 1 | 0 | 1 | 1 | 0 | 0 | 1 | 1 | 1 | 1 | 0 | 0 | 0 | 1 | 1 | 0 | 1 | 1 | 0 | 1 |
| 6  | 0 | 0 | 0 | 0 | 0 | 1 | 0 | 0 | 1 | 0 | 1 | 0 | 1 | 1 | 0 | 0 | 1 | 1 | 1 | 1 | 0 | 1 | 0 | 0 | 0 | 1 | 1 | 0 | 1 | 1 |
| 7  | 0 | 0 | 0 | 0 | 0 | 1 | 0 | 0 | 1 | 0 | 1 | 0 | 1 | 1 | 0 | 0 | 1 | 1 | 1 | 1 | 0 | 1 | 1 | 1 | 0 | 0 | 0 | 1 | 1 | 0 |
| 8  | 0 | 0 | 0 | 0 | 0 | 1 | 0 | 0 | 1 | 0 | 1 | 1 | 1 | 0 | 0 | 0 | 1 | 1 | 1 | 1 | 0 | 1 | 1 | 0 | 0 | 1 | 1 | 0 | 1 | 1 |
| 9  | 0 | 0 | 0 | 0 | 0 | 1 | 0 | 0 | 1 | 1 | 0 | 0 | 1 | 0 | 1 | 0 | 1 | 1 | 1 | 1 | 0 | 0 | 0 | 1 | 1 | 1 | 0 | 1 | 1 | 0 |
| 10 | 0 | 0 | 0 | 0 | 0 | 1 | 0 | 0 | 1 | 1 | 0 | 0 | 1 | 0 | 1 | 0 | 1 | 1 | 1 | 1 | 0 | 1 | 1 | 0 | 1 | 0 | 0 | 0 | 1 | 1 |
| 11 | 0 | 0 | 0 | 0 | 0 | 1 | 0 | 0 | 1 | 1 | 0 | 1 | 1 | 0 | 0 | 0 | 1 | 1 | 1 | 1 | 0 | 0 | 1 | 0 | 1 | 0 | 1 | 1 | 1 | 0 |
| 12 | 0 | 0 | 0 | 0 | 0 | 1 | 0 | 0 | 1 | 1 | 0 | 1 | 1 | 0 | 0 | 0 | 1 | 1 | 1 | 1 | 0 | 0 | 1 | 0 | 1 | 1 | 1 | 0 | 1 | 0 |
| 13 | 0 | 0 | 0 | 0 | 0 | 1 | 0 | 0 | 1 | 1 | 0 | 1 | 1 | 0 | 0 | 0 | 1 | 1 | 1 | 1 | 0 | 1 | 0 | 1 | 1 | 1 | 0 | 0 | 1 | 0 |
| 14 | 0 | 0 | 0 | 0 | 0 | 1 | 0 | 1 | 0 | 0 | 0 | 1 | 1 | 0 | 1 | 0 | 1 | 1 | 1 | 1 | 0 | 0 | 1 | 0 | 0 | 1 | 1 | 1 | 0 | 1 |
| 15 | 0 | 0 | 0 | 0 | 0 | 1 | 0 | 1 | 0 | 0 | 0 | 1 | 1 | 0 | 1 | 0 | 1 | 1 | 1 | 1 | 0 | 1 | 1 | 0 | 0 | 1 | 0 | 0 | 1 | 1 |
| 16 | 0 | 0 | 0 | 0 | 0 | 1 | 0 | 1 | 0 | 0 | 1 | 1 | 1 | 0 | 1 | 0 | 1 | 1 | 1 | 1 | 0 | 0 | 0 | 1 | 1 | 0 | 1 | 1 | 0 | 1 |
| 17 | 0 | 0 | 0 | 0 | 0 | 1 | 0 | 1 | 0 | 0 | 1 | 1 | 1 | 0 | 1 | 0 | 1 | 1 | 1 | 1 | 0 | 0 | 1 | 0 | 0 | 0 | 1 | 1 | 0 | 1 |
| 18 | 0 | 0 | 0 | 0 | 0 | 1 | 0 | 1 | 0 | 1 | 1 | 0 | 0 | 1 | 0 | 0 | 1 | 1 | 1 | 1 | 0 | 0 | 0 | 1 | 1 | 0 | 1 | 1 | 1 | 0 |
| 19 | 0 | 0 | 0 | 0 | 0 | 1 | 0 | 1 | 0 | 1 | 1 | 0 | 0 | 1 | 0 | 0 | 1 | 1 | 1 | 1 | 0 | 1 | 0 | 0 | 0 | 1 | 1 | 0 | 1 | 1 |
| 20 | 0 | 0 | 0 | 0 | 0 | 1 | 0 | 1 | 0 | 1 | 1 | 0 | 0 | 1 | 0 | 0 | 1 | 1 | 1 | 1 | 0 | 1 | 1 | 1 | 0 | 0 | 0 | 1 | 1 | 0 |
| 21 | 0 | 0 | 0 | 0 | 0 | 1 | 0 | 1 | 0 | 1 | 1 | 0 | 0 | 1 | 1 | 0 | 1 | 1 | 1 | 1 | 0 | 0 | 0 | 1 | 1 | 1 | 0 | 1 | 0 | 1 |
| 22 | 0 | 0 | 0 | 0 | 0 | 1 | 0 | 1 | 0 | 1 | 1 | 0 | 0 | 1 | 1 | 0 | 1 | 1 | 1 | 1 | 0 | 1 | 0 | 0 | 1 | 0 | 0 | 0 | 1 | 1 |
| 23 | 0 | 0 | 0 | 0 | 0 | 1 | 0 | 1 | 0 | 1 | 1 | 0 | 1 | 0 | 0 | 0 | 1 | 1 | 1 | 1 | 0 | 1 | 1 | 1 | 0 | 0 | 1 | 0 | 1 | 1 |
| 24 | 0 | 0 | 0 | 0 | 0 | 1 | 0 | 1 | 0 | 1 | 1 | 1 | 0 | 1 | 0 | 0 | 1 | 1 | 1 | 1 | 0 | 0 | 0 | 1 | 1 | 0 | 1 | 1 | 0 | 1 |
| 25 | 0 | 0 | 0 | 0 | 0 | 1 | 0 | 1 | 0 | 1 | 1 | 1 | 0 | 1 | 0 | 0 | 1 | 1 | 1 | 1 | 0 | 0 | 1 | 0 | 0 | 0 | 1 | 1 | 0 | 1 |
| 26 | 0 | 0 | 0 | 0 | 0 | 1 | 0 | 1 | 1 | 0 | 0 | 0 | 1 | 1 | 1 | 0 | 1 | 1 | 1 | 1 | 0 | 0 | 1 | 0 | 0 | 1 | 1 | 0 | 1 | 0 |
| 27 | 0 | 0 | 0 | 0 | 0 | 1 | 0 | 1 | 1 | 0 | 0 | 0 | 1 | 1 | 1 | 0 | 1 | 1 | 1 | 1 | 0 | 0 | 1 | 1 | 0 | 1 | 0 | 1 | 0 | 1 |
| 28 | 0 | 0 | 0 | 0 | 0 | 1 | 0 | 1 | 1 | 0 | 1 | 0 | 1 | 0 | 0 | 0 | 1 | 1 | 1 | 1 | 0 | 1 | 1 | 1 | 0 | 0 | 1 | 0 | 0 | 1 |

Fig. 9(a)

|    | 1           | 5 | | | |   |   |   |   |   | 10 |   |   |   |   | 15 |   |   |   |   | 20          |   |   |   |   | 25 |   |   |   |   | 30 |
|----|---|---|---|---|---|---|---|---|---|---|---|---|---|---|---|---|---|---|---|---|---|---|---|---|---|---|---|---|---|---|---|
| 29 | 0 | 0 | 0 | 0 | 0 | 1 | 0 | 1 | 1 | 0 | 1 | 1 | 1 | 0 | 0 | 0 | 1 | 1 | 1 | 1 | 0 | 1 | 0 | 1 | 0 | 0 | 1 | 1 | 0 | 0 | 1 |
| 30 | 0 | 0 | 0 | 0 | 0 | 1 | 0 | 1 | 1 | 1 | 0 | 0 | 1 | 0 | 0 | 0 | 1 | 1 | 1 | 1 | 0 | 1 | 0 | 1 | 0 | 0 | 1 | 1 | 0 | 1 | 1 |
| 31 | 0 | 0 | 0 | 0 | 0 | 1 | 0 | 1 | 1 | 1 | 0 | 0 | 1 | 0 | 0 | 0 | 1 | 1 | 1 | 1 | 0 | 1 | 1 | 0 | 1 | 0 | 1 | 0 | 0 | 1 | 1 |
| 32 | 0 | 0 | 0 | 0 | 0 | 1 | 0 | 1 | 1 | 1 | 0 | 1 | 0 | 1 | 0 | 0 | 1 | 1 | 1 | 1 | 0 | 0 | 0 | 1 | 1 | 0 | 1 | 1 | 0 | 0 | 1 |
| 33 | 0 | 0 | 0 | 0 | 0 | 1 | 0 | 1 | 1 | 1 | 0 | 1 | 0 | 1 | 0 | 0 | 1 | 1 | 1 | 1 | 0 | 0 | 1 | 0 | 0 | 0 | 1 | 1 | 0 | 1 | 1 |
| 34 | 0 | 0 | 0 | 0 | 0 | 1 | 0 | 1 | 1 | 1 | 0 | 1 | 1 | 0 | 0 | 0 | 1 | 1 | 1 | 1 | 0 | 0 | 1 | 0 | 0 | 1 | 1 | 0 | 1 | 0 | 1 |
| 35 | 0 | 0 | 0 | 0 | 0 | 1 | 0 | 1 | 1 | 1 | 0 | 1 | 1 | 0 | 0 | 0 | 1 | 1 | 1 | 1 | 0 | 0 | 1 | 1 | 0 | 1 | 0 | 1 | 0 | 0 | 1 |
| 36 | 0 | 0 | 0 | 0 | 0 | 1 | 1 | 0 | 0 | 1 | 0 | 0 | 1 | 1 | 1 | 0 | 1 | 1 | 1 | 1 | 0 | 0 | 0 | 1 | 0 | 1 | 0 | 1 | 1 | 0 | 1 |
| 37 | 0 | 0 | 0 | 0 | 0 | 1 | 1 | 0 | 0 | 1 | 0 | 0 | 1 | 1 | 1 | 0 | 1 | 1 | 1 | 1 | 0 | 0 | 0 | 1 | 0 | 1 | 1 | 0 | 1 | 0 | 1 |
| 38 | 0 | 0 | 0 | 0 | 0 | 1 | 1 | 0 | 0 | 1 | 0 | 1 | 0 | 1 | 1 | 0 | 1 | 1 | 1 | 1 | 0 | 0 | 0 | 1 | 0 | 0 | 1 | 1 | 1 | 0 | 1 |
| 39 | 0 | 0 | 0 | 0 | 0 | 1 | 1 | 0 | 0 | 1 | 0 | 1 | 0 | 1 | 1 | 0 | 1 | 1 | 1 | 1 | 0 | 1 | 0 | 0 | 0 | 1 | 0 | 0 | 1 | 1 | 1 |
| 40 | 0 | 0 | 0 | 0 | 0 | 1 | 1 | 0 | 0 | 1 | 0 | 1 | 0 | 1 | 1 | 0 | 1 | 1 | 1 | 1 | 0 | 1 | 0 | 0 | 1 | 1 | 1 | 0 | 0 | 0 | 1 |
| 41 | 0 | 0 | 0 | 0 | 0 | 1 | 1 | 0 | 1 | 0 | 0 | 0 | 1 | 0 | 1 | 0 | 1 | 1 | 1 | 1 | 0 | 0 | 1 | 0 | 0 | 1 | 1 | 1 | 0 | 1 | 1 |
| 42 | 0 | 0 | 0 | 0 | 0 | 1 | 1 | 0 | 1 | 0 | 0 | 0 | 1 | 0 | 1 | 0 | 1 | 1 | 1 | 1 | 0 | 1 | 1 | 0 | 0 | 1 | 0 | 0 | 1 | 1 | 1 |
| 43 | 0 | 0 | 0 | 0 | 0 | 1 | 1 | 0 | 1 | 0 | 1 | 0 | 0 | 0 | 1 | 0 | 1 | 1 | 1 | 1 | 0 | 0 | 1 | 0 | 0 | 1 | 1 | 1 | 0 | 1 | 1 |
| 44 | 0 | 0 | 0 | 0 | 0 | 1 | 1 | 0 | 1 | 0 | 1 | 0 | 0 | 0 | 1 | 0 | 1 | 1 | 1 | 1 | 0 | 1 | 1 | 0 | 0 | 1 | 0 | 0 | 1 | 1 | 1 |
| 45 | 0 | 0 | 0 | 0 | 0 | 1 | 1 | 0 | 1 | 1 | 0 | 0 | 0 | 1 | 0 | 0 | 1 | 1 | 1 | 1 | 0 | 0 | 1 | 0 | 1 | 0 | 1 | 1 | 1 | 0 | 1 |
| 46 | 0 | 0 | 0 | 0 | 0 | 1 | 1 | 0 | 1 | 1 | 0 | 0 | 0 | 1 | 0 | 0 | 1 | 1 | 1 | 1 | 0 | 0 | 1 | 0 | 1 | 1 | 1 | 0 | 1 | 0 | 1 |
| 47 | 0 | 0 | 0 | 0 | 0 | 1 | 1 | 0 | 1 | 1 | 0 | 0 | 0 | 1 | 0 | 0 | 1 | 1 | 1 | 1 | 0 | 1 | 0 | 1 | 1 | 1 | 0 | 0 | 1 | 0 | 1 |
| 48 | 0 | 0 | 0 | 0 | 0 | 1 | 1 | 0 | 1 | 1 | 0 | 0 | 1 | 0 | 1 | 0 | 1 | 1 | 1 | 1 | 0 | 0 | 0 | 1 | 0 | 0 | 1 | 1 | 1 | 0 | 1 |
| 49 | 0 | 0 | 0 | 0 | 0 | 1 | 1 | 0 | 1 | 1 | 0 | 0 | 1 | 0 | 1 | 0 | 1 | 1 | 1 | 1 | 0 | 1 | 0 | 0 | 0 | 1 | 0 | 0 | 1 | 1 | 1 |
| 50 | 0 | 0 | 0 | 0 | 0 | 1 | 1 | 0 | 1 | 1 | 0 | 0 | 1 | 0 | 1 | 0 | 1 | 1 | 1 | 1 | 0 | 1 | 0 | 0 | 1 | 1 | 1 | 0 | 0 | 0 | 1 |
| 51 | 0 | 0 | 0 | 0 | 0 | 1 | 1 | 0 | 1 | 1 | 1 | 0 | 0 | 1 | 0 | 0 | 1 | 1 | 1 | 1 | 0 | 1 | 0 | 0 | 0 | 1 | 0 | 1 | 0 | 1 | 1 |
| 52 | 0 | 0 | 0 | 0 | 0 | 1 | 1 | 0 | 1 | 1 | 1 | 0 | 0 | 1 | 0 | 0 | 1 | 1 | 1 | 1 | 0 | 1 | 0 | 1 | 0 | 0 | 0 | 1 | 0 | 1 | 1 |
| 53 | 0 | 0 | 0 | 0 | 0 | 1 | 1 | 0 | 1 | 1 | 1 | 0 | 0 | 1 | 0 | 0 | 1 | 1 | 1 | 1 | 0 | 1 | 0 | 1 | 1 | 0 | 0 | 0 | 1 | 0 | 1 |
| 54 | 0 | 0 | 0 | 0 | 0 | 1 | 1 | 1 | 0 | 0 | 0 | 1 | 0 | 0 | 1 | 0 | 1 | 1 | 1 | 1 | 0 | 1 | 1 | 0 | 0 | 1 | 1 | 0 | 1 | 0 | 1 |
| 55 | 0 | 0 | 0 | 0 | 0 | 1 | 1 | 1 | 0 | 0 | 0 | 1 | 0 | 1 | 1 | 0 | 1 | 1 | 1 | 1 | 0 | 1 | 0 | 1 | 0 | 0 | 1 | 1 | 0 | 0 | 1 |
| 56 | 0 | 0 | 0 | 0 | 0 | 1 | 1 | 1 | 0 | 0 | 1 | 0 | 0 | 0 | 1 | 0 | 1 | 1 | 1 | 1 | 0 | 1 | 0 | 1 | 0 | 0 | 1 | 1 | 0 | 1 | 1 |

Fig. 9(b)

|    | 1 | | | | 5 | | | | | 10 | | | | | 15 | | | | | 20 | | | | | 25 | | | | | 30 |
|----|---|---|---|---|---|---|---|---|---|----|---|---|---|---|----|---|---|---|---|----|---|---|---|---|----|---|---|---|---|----|
| 57 | 0 | 0 | 0 | 0 | 0 | 1 | 1 | 1 | 0 | 0  | 1 | 0 | 0 | 0 | 1  | 0 | 1 | 1 | 1 | 1  | 0 | 1 | 1 | 0 | 1  | 0 | 1 | 0 | 0 | 1 1 |
| 58 | 0 | 0 | 0 | 0 | 0 | 1 | 1 | 1 | 0 | 0  | 1 | 0 | 0 | 1 | 1  | 0 | 1 | 1 | 1 | 1  | 0 | 1 | 0 | 0 | 0  | 1 | 0 | 1 | 0 | 1 1 |
| 59 | 0 | 0 | 0 | 0 | 0 | 1 | 1 | 1 | 0 | 0  | 1 | 0 | 0 | 1 | 1  | 0 | 1 | 1 | 1 | 1  | 0 | 1 | 0 | 1 | 0  | 0 | 0 | 1 | 0 | 1 1 |
| 60 | 0 | 0 | 0 | 0 | 0 | 1 | 1 | 1 | 0 | 0  | 1 | 0 | 0 | 1 | 1  | 0 | 1 | 1 | 1 | 1  | 0 | 1 | 0 | 1 | 1  | 0 | 0 | 0 | 1 | 0 1 |
| 61 | 0 | 0 | 0 | 0 | 0 | 1 | 1 | 1 | 0 | 1  | 0 | 0 | 1 | 0 | 1  | 0 | 1 | 1 | 1 | 1  | 0 | 0 | 1 | 1 | 0  | 1 | 1 | 0 | 0 | 0 1 |
| 62 | 0 | 0 | 0 | 0 | 0 | 1 | 1 | 1 | 0 | 1  | 0 | 1 | 0 | 0 | 1  | 0 | 1 | 1 | 1 | 1  | 0 | 0 | 1 | 1 | 0  | 1 | 1 | 0 | 0 | 0 1 |
| 63 | 0 | 0 | 0 | 0 | 0 | 1 | 1 | 1 | 0 | 1  | 1 | 0 | 0 | 0 | 1  | 0 | 1 | 1 | 1 | 1  | 0 | 0 | 1 | 0 | 0  | 1 | 1 | 0 | 1 | 0 1 |
| 64 | 0 | 0 | 0 | 0 | 0 | 1 | 1 | 1 | 0 | 1  | 1 | 0 | 0 | 0 | 1  | 0 | 1 | 1 | 1 | 1  | 0 | 0 | 1 | 1 | 0  | 1 | 0 | 1 | 0 | 0 1 |

Fig. 9(c)

|    | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|----|---|---|---|---|---|---|---|---|---|----|----|----|----|----|----|----|----|----|----|----|----|----|----|----|----|----|----|----|----|----|----|----|
| 1  | 2 | 1 | 0 | 1 | 1 | 1 | 1 | 2 | 2 | 2  | 3  | 4  | 3  | 2  | 3  | 3  | 3  | 3  | 4  | 5  | 4  | 4  | 3  | 2  | 2  | 2  | 2  | 3  | 3  | 4  | 3  | 3  | 8 |
| 2  | 2 | 1 | 0 | 1 | 1 | 1 | 1 | 2 | 2 | 2  | 3  | 4  | 3  | 2  | 3  | 3  | 3  | 3  | 4  | 5  | 4  | 4  | 3  | 3  | 2  | 2  | 2  | 2  | 3  | 4  | 3  | 3  | 8 |
| 3  | 2 | 1 | 0 | 1 | 1 | 1 | 1 | 2 | 2 | 3  | 3  | 3  | 3  | 2  | 2  | 3  | 4  | 4  | 4  | 5  | 4  | 4  | 3  | 3  | 2  | 2  | 2  | 3  | 2  | 3  | 4  | 3  | 2 | 9 |
| 4  | 2 | 1 | 0 | 1 | 1 | 1 | 1 | 2 | 2 | 3  | 3  | 3  | 3  | 2  | 2  | 3  | 4  | 4  | 4  | 5  | 4  | 4  | 4  | 3  | 3  | 3  | 2  | 2  | 2  | 3  | 2  | 2 | 10 |
| 5  | 1 | 1 | 0 | 1 | 1 | 1 | 1 | 2 | 2 | 2  | 2  | 3  | 3  | 3  | 2  | 3  | 3  | 3  | 4  | 5  | 4  | 3  | 2  | 2  | 2  | 2  | 3  | 4  | 4  | 3  | 4  | 3  | 2 | 7 |
| 6  | 2 | 1 | 0 | 1 | 1 | 1 | 2 | 2 | 2 | 2  | 3  | 3  | 3  | 2  | 3  | 3  | 3  | 4  | 4  | 5  | 4  | 4  | 3  | 2  | 1  | 2  | 2  | 2  | 3  | 4  | 4  | 3  | 3 | 7 |
| 7  | 1 | 1 | 0 | 1 | 1 | 1 | 2 | 2 | 2 | 2  | 3  | 3  | 3  | 2  | 3  | 3  | 3  | 4  | 4  | 5  | 4  | 4  | 4  | 4  | 3  | 3  | 2  | 2  | 2  | 3  | 3  | 2 | 10 |
| 8  | 1 | 1 | 0 | 1 | 1 | 1 | 2 | 2 | 2 | 3  | 4  | 3  | 3  | 2  | 2  | 2  | 3  | 4  | 5  | 4  | 4  | 4  | 3  | 2  | 3  | 3  | 2  | 3  | 3  | 3  | 2  | 2 | 9 |
| 9  | 1 | 1 | 0 | 1 | 1 | 1 | 2 | 3 | 2 | 2  | 3  | 2  | 2  | 2  | 3  | 3  | 4  | 4  | 5  | 4  | 3  | 2  | 2  | 2  | 3  | 3  | 4  | 4  | 3  | 3  | 3  | 2 | 8 |
| 10 | 2 | 1 | 0 | 1 | 1 | 1 | 2 | 3 | 2 | 2  | 3  | 2  | 2  | 2  | 3  | 3  | 4  | 4  | 5  | 4  | 4  | 4  | 3  | 3  | 3  | 2  | 1  | 2  | 2  | 3  | 3  | 3 | 9 |
| 11 | 1 | 1 | 0 | 1 | 1 | 1 | 2 | 3 | 2 | 3  | 4  | 3  | 2  | 2  | 2  | 2  | 3  | 4  | 5  | 4  | 3  | 3  | 2  | 2  | 2  | 3  | 3  | 4  | 3  | 4  | 3  | 2 | 7 |
| 12 | 1 | 1 | 0 | 1 | 1 | 1 | 2 | 3 | 2 | 3  | 4  | 3  | 2  | 2  | 2  | 2  | 3  | 4  | 5  | 4  | 3  | 3  | 2  | 2  | 3  | 4  | 3  | 4  | 3  | 3  | 2  | 2 | 7 |
| 13 | 1 | 1 | 0 | 1 | 1 | 1 | 2 | 3 | 2 | 3  | 4  | 3  | 2  | 2  | 2  | 2  | 3  | 4  | 5  | 4  | 4  | 3  | 3  | 3  | 4  | 3  | 3  | 3  | 2  | 2  | 2  | 2 | 8 |
| 14 | 2 | 1 | 0 | 1 | 1 | 2 | 2 | 2 | 1 | 2  | 2  | 2  | 3  | 3  | 3  | 3  | 4  | 4  | 5  | 4  | 3  | 3  | 2  | 1  | 2  | 3  | 3  | 3  | 4  | 4  | 3  | 2 | 6 |
| 15 | 2 | 1 | 0 | 1 | 1 | 2 | 2 | 2 | 1 | 2  | 2  | 2  | 3  | 3  | 3  | 3  | 4  | 4  | 5  | 4  | 4  | 4  | 3  | 2  | 3  | 2  | 1  | 2  | 3  | 3  | 3  | 3 | 8 |
| 16 | 1 | 1 | 0 | 1 | 1 | 2 | 2 | 2 | 2 | 3  | 3  | 3  | 4  | 3  | 3  | 3  | 4  | 4  | 5  | 4  | 3  | 2  | 2  | 2  | 2  | 3  | 4  | 3  | 2  | 3  | 2  | 1 | 8 |
| 17 | 2 | 1 | 0 | 1 | 1 | 2 | 2 | 2 | 2 | 3  | 3  | 3  | 4  | 3  | 3  | 3  | 4  | 4  | 5  | 4  | 3  | 3  | 2  | 1  | 1  | 2  | 2  | 2  | 3  | 4  | 3  | 2 | 6 |
| 18 | 1 | 1 | 0 | 1 | 1 | 2 | 2 | 3 | 3 | 3  | 2  | 3  | 2  | 1  | 2  | 3  | 3  | 4  | 5  | 4  | 3  | 2  | 2  | 2  | 2  | 3  | 4  | 4  | 3  | 4  | 3  | 2 | 6 |
| 19 | 2 | 1 | 0 | 1 | 1 | 2 | 2 | 3 | 3 | 3  | 2  | 3  | 2  | 1  | 2  | 3  | 3  | 4  | 5  | 4  | 4  | 3  | 2  | 1  | 2  | 2  | 2  | 3  | 4  | 4  | 3  | 3 | 6 |
| 20 | 1 | 1 | 0 | 1 | 1 | 2 | 2 | 3 | 3 | 3  | 2  | 3  | 2  | 1  | 2  | 3  | 3  | 4  | 5  | 4  | 4  | 4  | 3  | 3  | 2  | 2  | 2  | 2  | 3  | 3  | 2  | 2 | 9 |
| 21 | 1 | 1 | 0 | 1 | 1 | 2 | 2 | 3 | 3 | 3  | 2  | 3  | 3  | 2  | 3  | 4  | 4  | 4  | 5  | 4  | 3  | 2  | 2  | 2  | 3  | 3  | 4  | 3  | 2  | 2  | 2  | 1 | 9 |
| 22 | 2 | 1 | 0 | 1 | 1 | 2 | 2 | 3 | 3 | 3  | 2  | 3  | 3  | 2  | 3  | 4  | 4  | 4  | 5  | 4  | 4  | 3  | 2  | 2  | 2  | 1  | 1  | 2  | 2  | 3  | 3  | 3 | 8 |
| 23 | 2 | 1 | 0 | 1 | 1 | 2 | 2 | 3 | 3 | 3  | 3  | 3  | 2  | 1  | 2  | 2  | 3  | 4  | 5  | 4  | 4  | 4  | 3  | 3  | 3  | 2  | 1  | 2  | 3  | 2  | 2  | 2 | 8 |
| 24 | 1 | 1 | 0 | 1 | 1 | 2 | 2 | 3 | 3 | 4  | 3  | 4  | 3  | 2  | 2  | 3  | 3  | 4  | 5  | 4  | 3  | 2  | 2  | 2  | 2  | 3  | 4  | 3  | 2  | 3  | 2  | 1 | 7 |
| 25 | 2 | 1 | 0 | 1 | 1 | 2 | 2 | 3 | 3 | 4  | 3  | 4  | 3  | 2  | 2  | 3  | 3  | 4  | 5  | 4  | 3  | 3  | 2  | 1  | 1  | 2  | 2  | 2  | 3  | 4  | 3  | 2 | 5 |
| 26 | 1 | 1 | 0 | 1 | 1 | 2 | 3 | 3 | 2 | 2  | 2  | 2  | 3  | 3  | 4  | 4  | 4  | 4  | 5  | 4  | 3  | 3  | 2  | 1  | 2  | 3  | 2  | 3  | 3  | 3  | 2  | 2 | 9 |
| 27 | 1 | 1 | 0 | 1 | 1 | 2 | 3 | 3 | 2 | 2  | 2  | 2  | 3  | 3  | 4  | 4  | 4  | 4  | 5  | 4  | 3  | 3  | 3  | 2  | 3  | 3  | 3  | 2  | 2  | 2  | 2  | 1 | 10 |
| 28 | 2 | 1 | 0 | 1 | 1 | 2 | 3 | 3 | 3 | 3  | 3  | 2  | 2  | 1  | 2  | 2  | 3  | 4  | 5  | 4  | 4  | 4  | 3  | 3  | 3  | 2  | 1  | 2  | 3  | 2  | 2  | 2 | 8 |

Fig. 10(a)

|    | 1 |   |   | 5 |   |   |   |   | 10 |   |   |   |   | 15 |   |   |   |   | 20 |   |   |   |   | 25 |   |   |   |   | 30 |   |   |    |
|----|---|---|---|---|---|---|---|---|----|---|---|---|---|----|---|---|---|---|----|---|---|---|---|----|---|---|---|---|----|---|---|----|
| 29 | 1 | 1 | 0 | 1 | 1 | 2 | 3 | 3 | 3  | 4 | 4 | 3 | 3 | 2  | 2 | 2 | 3 | 4 | 5  | 4 | 4 | 3 | 3 | 2  | 2 | 2 | 3 | 2 | 2  | 3 | 2 | 1 | 8 |
| 30 | 2 | 1 | 0 | 1 | 1 | 2 | 3 | 4 | 3  | 3 | 3 | 2 | 1 | 1  | 2 | 2 | 3 | 4 | 5  | 4 | 4 | 3 | 3 | 2  | 2 | 2 | 3 | 2 | 3  | 4 | 3 | 2 | 6 |
| 31 | 2 | 1 | 0 | 1 | 1 | 2 | 3 | 4 | 3  | 3 | 3 | 2 | 1 | 1  | 2 | 2 | 3 | 4 | 5  | 4 | 4 | 4 | 3 | 3  | 3 | 3 | 2 | 2 | 2  | 3 | 2 | 2 | 7 |
| 32 | 1 | 1 | 0 | 1 | 1 | 2 | 3 | 4 | 3  | 4 | 3 | 3 | 2 | 2  | 2 | 3 | 3 | 4 | 5  | 4 | 3 | 2 | 2 | 2  | 2 | 3 | 4 | 3 | 2  | 3 | 2 | 1 | 7 |
| 33 | 2 | 1 | 0 | 1 | 1 | 2 | 3 | 4 | 3  | 4 | 3 | 3 | 2 | 2  | 2 | 3 | 3 | 4 | 5  | 4 | 3 | 3 | 2 | 1  | 1 | 2 | 2 | 2 | 3  | 4 | 3 | 2 | 5 |
| 34 | 1 | 1 | 0 | 1 | 1 | 2 | 3 | 4 | 3  | 4 | 4 | 3 | 2 | 2  | 2 | 2 | 3 | 4 | 5  | 4 | 3 | 3 | 2 | 1  | 2 | 3 | 2 | 3 | 3  | 3 | 2 | 2 | 6 |
| 35 | 1 | 1 | 0 | 1 | 1 | 2 | 3 | 4 | 3  | 4 | 4 | 3 | 2 | 2  | 2 | 2 | 3 | 4 | 5  | 4 | 3 | 3 | 3 | 2  | 3 | 3 | 3 | 2 | 2  | 2 | 2 | 1 | 7 |
| 36 | 1 | 1 | 0 | 1 | 2 | 2 | 2 | 3 | 2  | 1 | 2 | 3 | 3 | 3  | 4 | 4 | 4 | 4 | 5  | 4 | 3 | 2 | 2 | 1  | 2 | 2 | 3 | 3 | 3  | 3 | 3 | 2 | 8 |
| 37 | 1 | 1 | 0 | 1 | 2 | 2 | 2 | 3 | 2  | 1 | 2 | 3 | 3 | 3  | 4 | 4 | 4 | 4 | 5  | 4 | 3 | 2 | 2 | 1  | 2 | 3 | 3 | 3 | 3  | 3 | 2 | 2 | 8 |
| 38 | 1 | 1 | 0 | 1 | 2 | 2 | 2 | 3 | 2  | 2 | 2 | 3 | 3 | 3  | 3 | 4 | 4 | 4 | 5  | 4 | 3 | 2 | 2 | 1  | 1 | 2 | 3 | 3 | 3  | 4 | 3 | 2 | 7 |
| 39 | 2 | 1 | 0 | 1 | 2 | 2 | 2 | 3 | 2  | 2 | 2 | 3 | 3 | 3  | 3 | 4 | 4 | 4 | 5  | 4 | 4 | 3 | 2 | 1  | 2 | 1 | 1 | 2 | 3  | 3 | 3 | 3 | 7 |
| 40 | 1 | 1 | 0 | 1 | 2 | 2 | 2 | 3 | 2  | 2 | 2 | 3 | 3 | 3  | 3 | 4 | 4 | 4 | 5  | 4 | 4 | 3 | 2 | 2  | 3 | 3 | 3 | 3 | 2  | 2 | 1 | 1 | 10 |
| 41 | 2 | 1 | 0 | 1 | 2 | 2 | 3 | 3 | 2  | 1 | 2 | 1 | 2 | 2  | 3 | 3 | 4 | 4 | 5  | 4 | 3 | 3 | 2 | 1  | 2 | 3 | 3 | 3 | 4  | 4 | 3 | 2 | 5 |
| 42 | 2 | 1 | 0 | 1 | 2 | 2 | 3 | 3 | 2  | 1 | 2 | 1 | 2 | 2  | 3 | 3 | 4 | 4 | 5  | 4 | 4 | 4 | 3 | 2  | 3 | 2 | 1 | 2 | 3  | 3 | 3 | 3 | 7 |
| 43 | 2 | 1 | 0 | 1 | 2 | 2 | 3 | 3 | 2  | 2 | 1 | 2 | 1 | 2  | 3 | 3 | 4 | 4 | 5  | 4 | 3 | 3 | 2 | 1  | 2 | 3 | 3 | 3 | 4  | 4 | 3 | 2 | 5 |
| 44 | 2 | 1 | 0 | 1 | 2 | 2 | 3 | 3 | 2  | 2 | 1 | 2 | 1 | 2  | 3 | 3 | 4 | 4 | 5  | 4 | 4 | 4 | 3 | 2  | 3 | 2 | 1 | 2 | 3  | 3 | 3 | 3 | 7 |
| 45 | 1 | 1 | 0 | 1 | 2 | 2 | 3 | 4 | 3  | 2 | 2 | 2 | 1 | 1  | 2 | 3 | 3 | 4 | 5  | 4 | 3 | 3 | 2 | 2  | 2 | 3 | 3 | 4 | 3  | 4 | 3 | 2 | 5 |
| 46 | 1 | 1 | 0 | 1 | 2 | 2 | 3 | 4 | 3  | 2 | 2 | 2 | 1 | 1  | 2 | 3 | 3 | 4 | 5  | 4 | 3 | 3 | 2 | 2  | 3 | 4 | 3 | 4 | 3  | 3 | 2 | 2 | 5 |
| 47 | 1 | 1 | 0 | 1 | 2 | 2 | 3 | 4 | 3  | 2 | 2 | 2 | 1 | 1  | 2 | 3 | 3 | 4 | 5  | 4 | 4 | 3 | 3 | 3  | 4 | 3 | 3 | 3 | 2  | 2 | 2 | 2 | 6 |
| 48 | 1 | 1 | 0 | 1 | 2 | 2 | 3 | 4 | 3  | 2 | 3 | 2 | 2 | 2  | 3 | 3 | 4 | 4 | 5  | 4 | 3 | 2 | 2 | 1  | 1 | 2 | 3 | 3 | 3  | 4 | 3 | 2 | 6 |
| 49 | 2 | 1 | 0 | 1 | 2 | 2 | 3 | 4 | 3  | 2 | 3 | 2 | 2 | 2  | 3 | 3 | 4 | 4 | 5  | 4 | 4 | 3 | 2 | 1  | 2 | 1 | 1 | 2 | 3  | 3 | 3 | 3 | 6 |
| 50 | 1 | 1 | 0 | 1 | 2 | 2 | 3 | 4 | 3  | 2 | 3 | 2 | 2 | 2  | 3 | 3 | 4 | 4 | 5  | 4 | 4 | 2 | 2 | 3  | 3 | 3 | 3 | 2 | 2  | 1 | 1 |   | 9 |
| 51 | 2 | 1 | 0 | 1 | 2 | 2 | 3 | 4 | 4  | 3 | 3 | 3 | 2 | 1  | 2 | 3 | 3 | 4 | 5  | 4 | 4 | 3 | 2 | 1  | 2 | 1 | 2 | 2 | 3  | 3 | 3 | 2 | 5 |
| 52 | 2 | 1 | 0 | 1 | 2 | 2 | 3 | 4 | 4  | 3 | 3 | 3 | 2 | 1  | 2 | 3 | 3 | 4 | 5  | 4 | 4 | 3 | 3 | 2  | 2 | 1 | 2 | 1 | 2  | 3 | 3 | 2 | 5 |
| 53 | 1 | 1 | 0 | 1 | 2 | 2 | 3 | 4 | 4  | 3 | 3 | 3 | 2 | 1  | 2 | 3 | 3 | 4 | 5  | 4 | 4 | 3 | 3 | 3  | 3 | 2 | 2 | 2 | 1  | 2 | 2 | 2 | 6 |
| 54 | 1 | 1 | 0 | 1 | 2 | 3 | 3 | 3 | 2  | 2 | 1 | 1 | 2 | 2  | 2 | 3 | 4 | 4 | 5  | 4 | 4 | 4 | 3 | 2  | 3 | 3 | 2 | 3 | 3  | 3 | 2 | 2 | 8 |
| 55 | 1 | 1 | 0 | 1 | 2 | 3 | 3 | 3 | 2  | 2 | 1 | 2 | 3 | 3  | 3 | 4 | 4 | 4 | 5  | 4 | 4 | 3 | 3 | 2  | 2 | 2 | 3 | 2 | 2  | 3 | 2 | 1 | 9 |
| 56 | 2 | 1 | 0 | 1 | 2 | 3 | 3 | 3 | 3  | 2 | 1 | 1 | 2 | 1  | 2 | 3 | 4 | 4 | 5  | 4 | 4 | 3 | 3 | 2  | 2 | 2 | 3 | 2 | 3  | 4 | 3 | 2 | 6 |

Fig. 10(b)

|    | 1 |   |   | 5 |   |   |   |   | 10 |   |   |   |   | 15 |   |   |   |   | 20 |   |   |   |   | 25 |   |   |   |   | 30 |   |   |   |
|----|---|---|---|---|---|---|---|---|----|---|---|---|---|----|---|---|---|---|----|---|---|---|---|----|---|---|---|---|----|---|---|---|
| 57 | 2 | *1* | 0 | *1* | 2 | 3 | 3 | 3 | 3 | 2 | 1 | 1 | 2 | 1 | 2 | 3 | *4* | *4* | 5 | *4* | *4* | *4* | 3 | 3 | 3 | 3 | 2 | 2 | 2 | 3 | 2 | 2 | 7 |
| 58 | 2 | *1* | 0 | *1* | 2 | 3 | 3 | 3 | 3 | 2 | 1 | 2 | 3 | 2 | 3 | *4* | *4* | *4* | 5 | *4* | *4* | 3 | 2 | 1 | 2 | 1 | 2 | 2 | 3 | 3 | 3 | 2 | 7 |
| 59 | 2 | *1* | 0 | *1* | 2 | 3 | 3 | 3 | 3 | 2 | 1 | 2 | 3 | 2 | 3 | *4* | *4* | *4* | 5 | *4* | *4* | 3 | 3 | 2 | 2 | 1 | 2 | 1 | 2 | 3 | 3 | 2 | 7 |
| 60 | *1* | *1* | 0 | *1* | 2 | 3 | 3 | 3 | 3 | 2 | 1 | 2 | 3 | 2 | 3 | *4* | *4* | *4* | 5 | *4* | *4* | 3 | 3 | 3 | 3 | 2 | 2 | 2 | 1 | 2 | 2 | 2 | 8 |
| 61 | *1* | *1* | 0 | *1* | 2 | 3 | 3 | 4 | 3 | 2 | 2 | 2 | 2 | 2 | 3 | 3 | *4* | *4* | 5 | *4* | 3 | 3 | 3 | 2 | 3 | *4* | 3 | 2 | 2 | 2 | *1* | *1* | 7 |
| 62 | *1* | *1* | 0 | *1* | 2 | 3 | 3 | 4 | 3 | 3 | 2 | 2 | 2 | 2 | 2 | 3 | *4* | *4* | 5 | *4* | 3 | 3 | 3 | 2 | 3 | *4* | 3 | 2 | 2 | 2 | *1* | *1* | 7 |
| 63 | *1* | *1* | 0 | *1* | 2 | 3 | 3 | 4 | 4 | 3 | 2 | 2 | 2 | 1 | 2 | 3 | *4* | *4* | 5 | *4* | 3 | 3 | 2 | 1 | 2 | 3 | 2 | 3 | 3 | 3 | 2 | 2 | 6 |
| 64 | *1* | *1* | 0 | *1* | 2 | 3 | 3 | 4 | 4 | 3 | 2 | 2 | 2 | 1 | 2 | 3 | *4* | *4* | 5 | *4* | 3 | 3 | 3 | 2 | 3 | 3 | 3 | 2 | 2 | 2 | 2 | *1* | 7 |

Fig. 10(c)

ROTARY CODING DISC AND METHOD FOR DESIGNING THE SAME

This application claims priority for the Taiwan (R.O.C.) patent application no. 109114534 filed on 30 Apr. 2020, the content of which is incorporated by reference in its entirely.

BACKGROUND OF THE INVENTION

Field of the Invention

The present invention relates to a coding disc and a method for designing the same, particularly to a rotary coding disc and a method for designing the same.

Description of the Related Art

With the development of industrial precision instrument technology, the application of servo systems becomes more and more important. Precision positioning systems are an important part of the servo systems. Encoders are the most important components. Optical rotary encoders have advantages of high resolution, non-contact and small size. The conventional optical encoder includes an optical structure, a light source, and a photosensor. In general, the optical structure has a plurality of regions for passing light. When the optical structure rotates, the photosensor receives an optical signal with a specific periodicity. The optical encoder can determine the displacement, angular displacement, and rotational speed of the object driven by the driving component according to the optical signal.

Please refer to FIG. 1, which is a schematic diagram of a conventional linear encoder. The linear encoder comprises a light source 10, a coding disc 12, a lens element 14, a target lens element 16, and a photosensor 18. The coding disc 12 has a lattice pattern including light-transmitting regions and non-light-transmitting regions alternately arranged. The light source 10 emits light which is directed toward the coding disc 12 after being refracted by the lens element 14 into parallel light. The light passing through the coding disc 12 can form an image to represent the lattice pattern that passes through the target lens element 16 and is sensed by the photosensor 18. The photosensor 18 includes a plurality of photocells disposed in parallel to the coding disc 12 and configured to output voltage signals, and each voltage signal has an amplitude corresponding to the intensity of the light emitting to the photocell. When demand for alignment between components in the current technology increases, the density of the periodic regions of the coding disc of the existing optical encoder is also increased. However, the resolution of the voltage signal is influenced by the code arrangement of the coding disc 12.

Suppose that the positions of transparent areas and opaque areas of the coding disc 12 are arranged based on nine-bit De Bruijn sequences formed of 1 and 0, wherein 1 and 0 respectively represent the positions of transparent areas and opaque areas. The coding disc 12 is divided into 512 positions. The nine-bit De Bruijn sequences include $2^{247}$ De Bruijn sequences. Table 1 shows one of the nine-bit De Bruijn sequences. From Table 1 of FIG. 4 and FIG. 2, it is known that 111111111 neighbors 000000000 in position. The intensity of the voltage signal is illustrated in FIG. 3 during the coding disc 12 rotates one cycle. At about 0.1 second, the intensity of the voltage signal suddenly drops. As a result, it is difficult to perform subsequent binarization due to the unstable signal.

To overcome the abovementioned problems, the present invention provides a rotary coding disc and a method for designing the same, to solve the aforementioned problems of the prior art.

SUMMARY OF THE INVENTION

One objective of the present invention is to provide a rotary coding disc and a method for designing the same, which locate the maximum binary code and the minimum binary code of the De Bruijn sequence in the diagonal positions of the rotary coding disc in order to effectively reduce the variation of the voltage level of a periodic signal and the burden of the processing circuit in the back end.

To overcome the abovementioned problems, the present invention provides a rotary coding disc applied to an optical encoder. The rotary coding disc includes: a plurality of transparent areas; and a plurality of opaque areas; wherein the plurality of transparent areas and the plurality of opaque areas are circularly distributed; wherein N-bit De Bruijn sequences include 1 and 0, the number of the N-bit De Bruijn sequences is $2^{[2^{(N-1)}-N]}$, N is a natural number larger than or equal to 3, and each of the N-bit De Bruijn sequences has a length of $2^N$, a maximum binary code with a length of N bits, and a minimum binary code with a length of N bits; wherein when a binary code with a length of M bits is located between the maximum binary code and the minimum binary code, the corresponding N-bit De Bruijn sequences are selected as diagonal De Bruijn sequences, M is a positive integer, and $$\frac{2^N - 2N}{2} - \frac{N}{2} < M < \frac{2^N - 2N}{2} + \frac{N}{2};$$

wherein positions of the plurality of transparent areas and the plurality of opaque areas are arranged based on the diagonal De Bruijn sequences.

In an embodiment of the present invention, the first number of each bit of the diagonal De Bruijn sequence is added to the second numbers of (N−1) bits consecutively neighboring the first number to obtain the value of the energy level, the value of the energy level replaces a corresponding the first number to convert the diagonal De Bruijn sequence into a De Bruijn energy level, the De Bruijn energy level includes the value of the energy level, the value of the energy level is a non-negative integer less than or equal to N, the total number of 1 consecutively neighboring 0 and (N−1) consecutively neighboring N of the De Bruijn energy level is calculated, and the positions of the plurality of transparent areas and the plurality of opaque areas are arranged based on the De Bruijn energy level that corresponds to the total number less than or equal to N.

In an embodiment of the present invention, the positions of 1 and 0 of the diagonal De Bruijn sequence respectively correspond to the positions of each of the plurality of transparent areas and each of the plurality of opaque areas.

In an embodiment of the present invention, the positions of 0 and 1 of the diagonal De Bruijn sequence respectively correspond to the positions of each of the plurality of transparent areas and each of the plurality of opaque areas.

In an embodiment of the present invention, a number of each bit of the maximum binary code is 1 and a number of each bit of the minimum binary code is 0.

In an embodiment of the present invention, a method for designing a rotary coding disc is applied to an optical encoder with transparent areas and opaque areas. The method includes: forming N-bit De Bruijn sequences with 1 and 0, the N-bit De Bruijn sequences include $2^{[2^{(N-1)}-N]}$ different De Bruijn sequences, wherein N is a natural number larger than or equal to 3, and each of the N-bit De Bruijn sequences has a length of $2^N$, a maximum binary code with a length of N bits, and a minimum binary code with a length of N bits; when a binary code with a length of M bits is located between the maximum binary code and the minimum binary code, the corresponding N-bit De Bruijn sequences are selected as diagonal De Bruijn sequences, M is a positive integer, and $$\frac{2^N - 2N}{2} - \frac{N}{2} < M < \frac{2^N - 2N}{2} + \frac{N}{2};$$

and arranging positions of the transparent areas and the opaque areas based on the diagonal De Bruijn sequences, wherein the transparent areas and the opaque areas are circularly distributed.

In an embodiment of the present invention, after the step of selecting the diagonal De Bruijn sequences, the method further includes: adding the first number of each bit of the diagonal De Bruijn sequence to the second numbers of (N−1) bits consecutively neighboring the first number to obtain a value of the energy level, and replacing a corresponding the first number with the value of the energy level to convert the diagonal De Bruijn sequence into a De Bruijn energy level, wherein the De Bruijn energy level includes the value of the energy level, and the value of the energy level is a non-negative integer less than or equal to N, and calculating the total number of 1 consecutively neighboring 0 and (N−1) consecutively neighboring N of the De Bruijn energy level, and arranging the positions of the transparent areas and the opaque areas based on the De Bruijn energy level that corresponds to the total number less than or equal to N.

In an embodiment of the present invention, the positions of 1 and 0 of the diagonal De Bruijn sequence respectively correspond to the positions of the transparent area and the opaque area.

In an embodiment of the present invention, the positions of 0 and 1 of the diagonal De Bruijn sequence respectively correspond to the positions of the transparent area and the opaque area.

In an embodiment of the present invention, a number of each bit of the maximum binary code is 1 and a number of each bit of the minimum binary code is 0.

Below, the embodiments are described in detail in cooperation with the drawings to make easily understood the technical contents, characteristics, and accomplishments of the present invention.

BRIEF DESCRIPTION OF THE DRAWINGS

FIG. 4 is a diagram illustrating Table 1;

FIG. 8 is a diagram illustrating Table 2;

FIGS. 9(a)-9(c) are diagrams illustrating Table 3;

FIGS. 10(a)-10(c) are diagrams illustrating Table 4; and

DETAILED DESCRIPTION OF THE INVENTION

Figure 1:
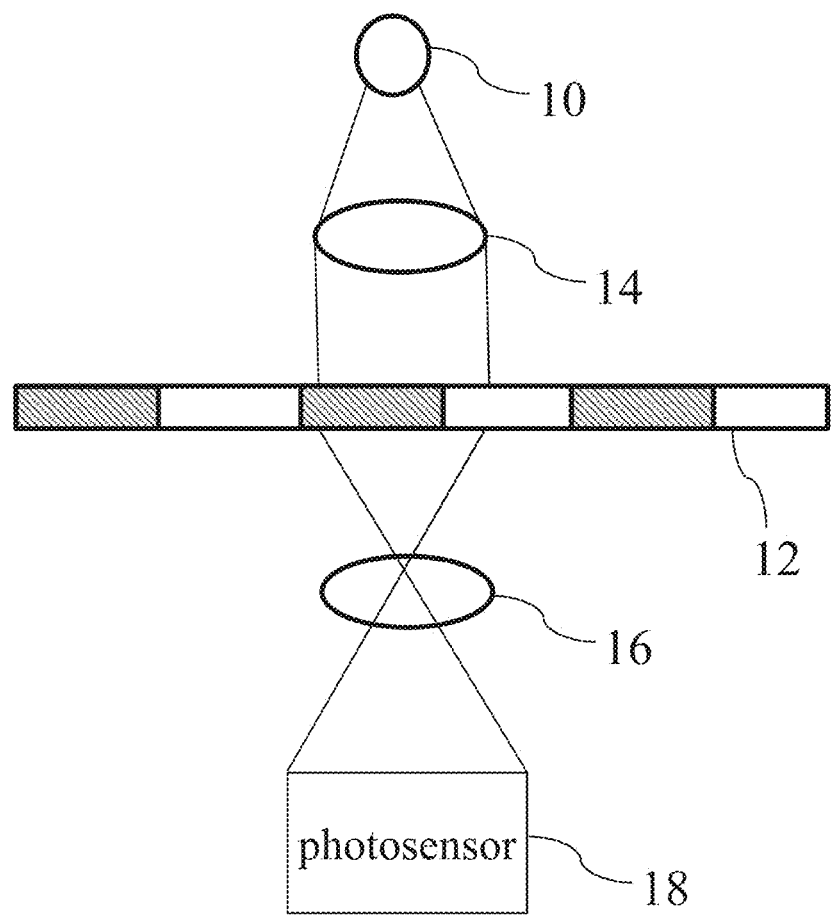
FIG. 1 is a diagram schematically illustrating a conventional optical encoder.
Figure 2:
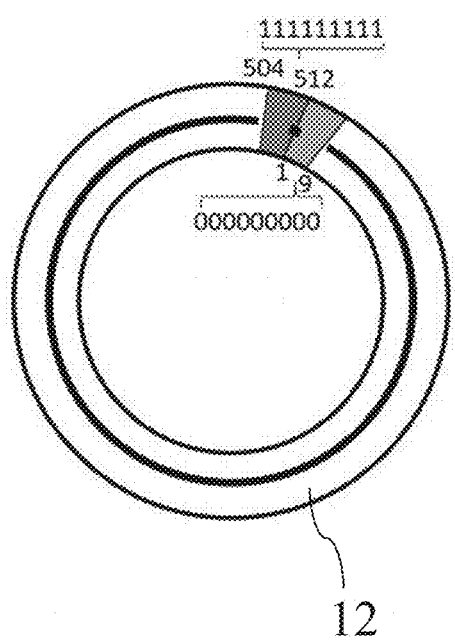
FIG. 2 is a diagram schematically illustrating a conventional coding disc.
Figure 3:
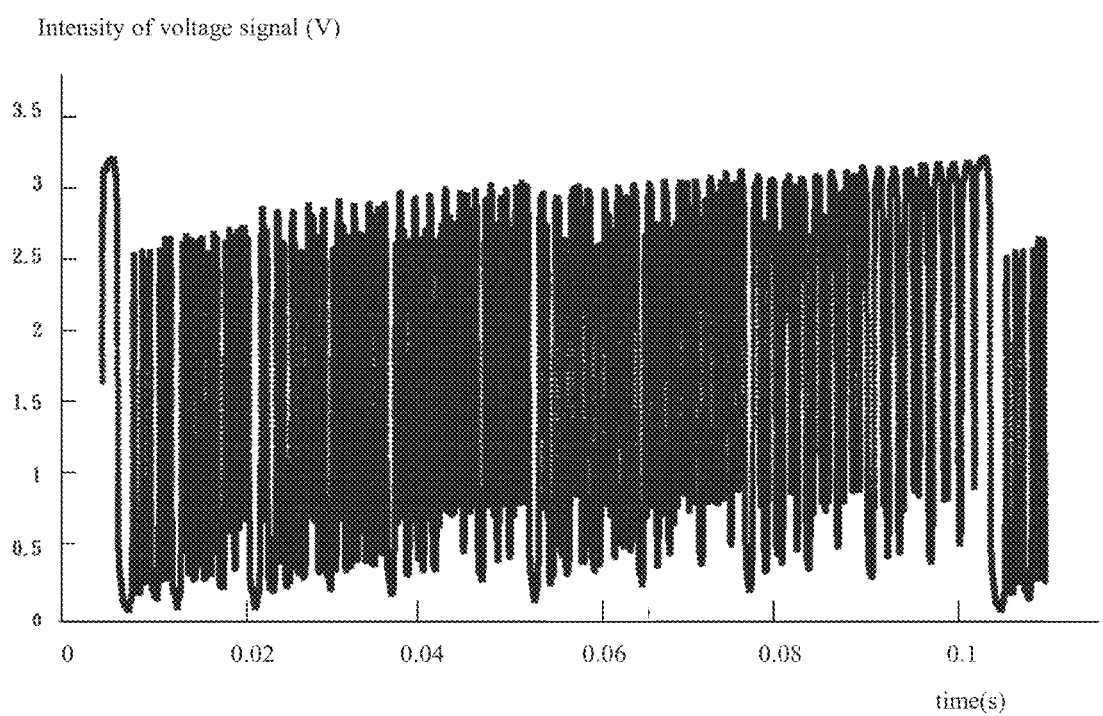
FIG. 3 is a diagram schematically illustrating the intensity of the waveform of a conventional voltage signal.
Figure 5:
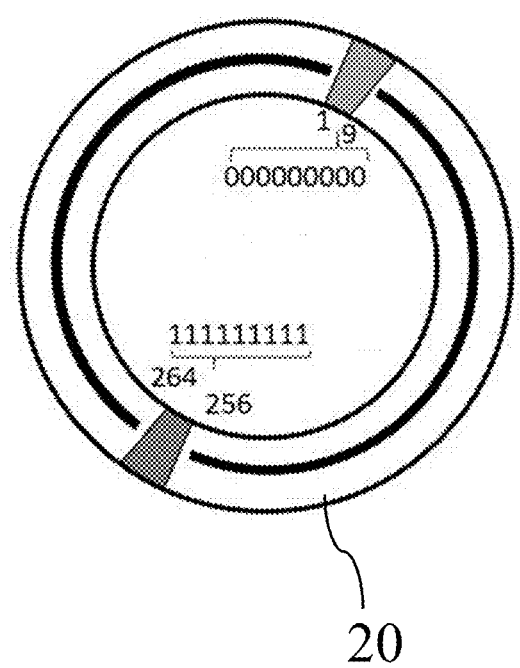
FIG. 5 is a diagram schematically illustrating a rotary coding disc according to an embodiment of the present invention.
Figure 6:
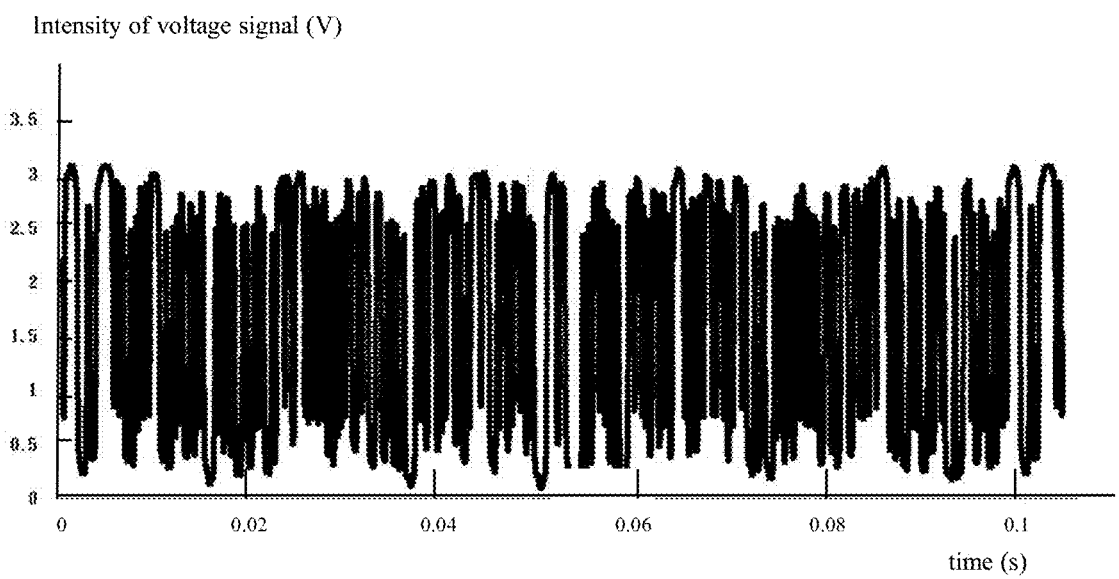
FIG. 6 is a diagram schematically illustrating the intensity of the waveform of a voltage signal of the present invention.

FIG. 5 is a diagram schematically illustrating a rotary coding disc according to an embodiment of the present invention. FIG. 6 is a diagram schematically illustrating the intensity of the waveform of a voltage signal of the present invention. Referring to FIG. 5 and FIG. 6, an embodiment of the method for designing a rotary coding disc 20 is introduced as follows. The rotary coding disc 20 is applied to an optical encoder. The rotary coding disc 20 includes a plurality of transparent areas and a plurality of opaque areas. The plurality of transparent areas and the plurality of opaque areas are circularly distributed. In the method, N-bit De Bruijn sequences with 1 and 0 are used, wherein the number of the N-bit De Bruijn sequences is $2^{[2^{(N-1)}-N]}$, N is a natural number larger than or equal to 3. Each N-bit De Bruijn sequence updates one bit within one cycle to represent $2^N$ different N-bit sequences. For example, a three-bit De Bruijn sequence may be 00010111. The three-bit De Bruijn sequence represents 8 different three-bit subsequences, namely 000, 001, 010, 101, 011, 111, 110, and 100. Each N-bit De Bruijn sequence has a length of $2^N$, the maximum binary code with a length of N bits, and the minimum binary code with a length of N bits. For example, the positions of the transparent areas and the opaque areas of the rotary coding disc 20 are arranged based on the N-bit De Bruijn sequences including 0 and 1. In an embodiment, the positions of 1 and 0 respectively correspond to the positions of the transparent area and the opaque area. In another embodiment, the positions of 0 and 1 respectively correspond to the positions of the transparent area and the opaque area. In some embodiment of the present invention, a number of each bit of the maximum binary code is 1 and a number of each bit of the minimum binary code is 0, but the present invention is not limited thereto.

Figure 7:
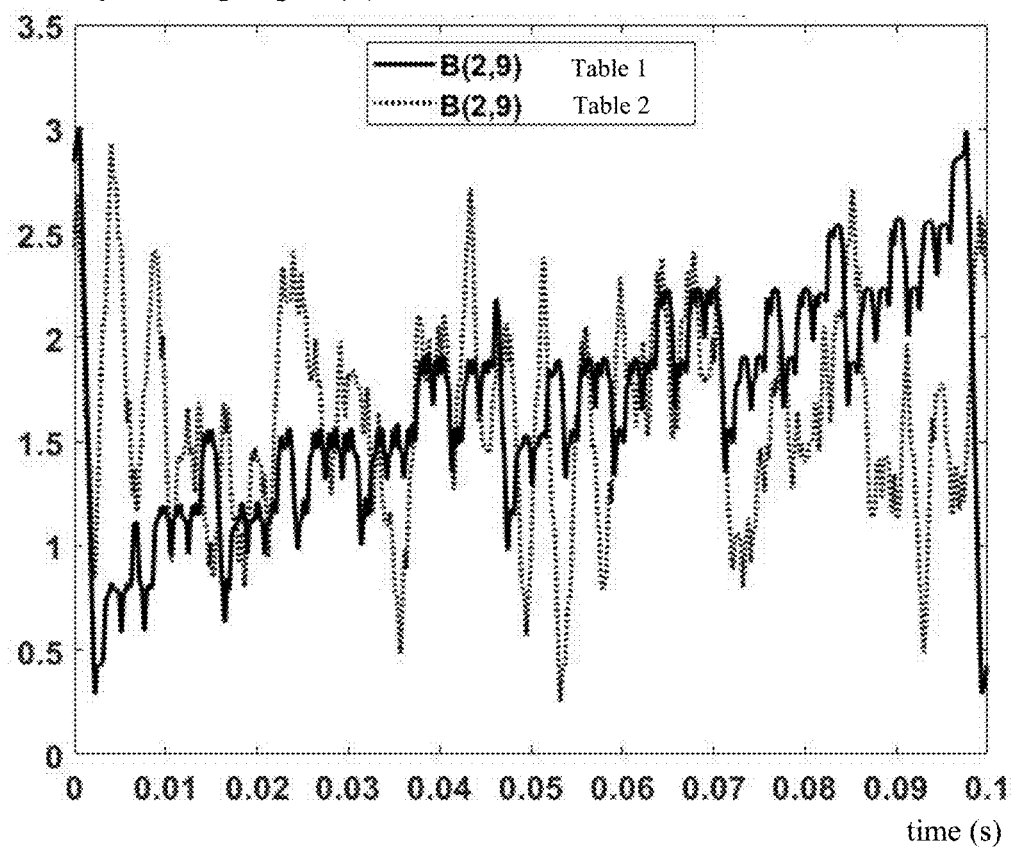
FIG. 7 is a diagram schematically illustrating the intensity of the waveform of voltage signals corresponding to Table 1 and Table 2 of the present invention.

If N=9, the positions of transparent areas and opaque areas of the rotary coding disc 20 are arranged based on nine-bit De Bruijn sequences formed of 1 and 0, wherein 1 and 0 respectively represent the positions of transparent areas and opaque areas. The rotary coding disc 20 is divided into 512 positions. The nine-bit De Bruijn sequences include $2^{247}$ De Bruijn sequences. Take Table 2 as an example. Table 2 shows one of the nine-bit De Bruijn sequences. From Table 2 of FIG. 8 and FIG. 5, 111111111 and 000000000 are located in diagonal positions of the rotary coding disc 20. In other words, the maximum binary code and the minimum binary code are located in the diagonal positions of the rotary coding disc 20. In an optical encoder, a photosensor receives a light signal through the rotary coding disc 20 to generate a current signal. The photosensor converts the current signal into a voltage signal through the resistances. The intensity of the voltage signal is illustrated in FIG. 6 during the rotary coding disc 20 rotates one cycle. FIG. 7 is a diagram schematically illustrating the intensity of the waveform of voltage signals corresponding to Table 1 and Table 2 of the present invention. Compared with the voltage signal corresponding to Table 1, the voltage signal corresponding to Table 2 can effectively reduce the variation of the voltage level of a periodic signal and the burden of the processing circuit in the back end.

If N=5, the positions of transparent areas and opaque areas of the rotary coding disc 20 are arranged based on five-bit De Bruijn sequences formed of 1 and 0, wherein 1 and 0 respectively represent the positions of transparent areas and opaque areas. The rotary coding disc 20 is divided into 32 positions, wherein position 1, position 2, . . . , position 31, and position 32 respectively represent the first bit, the second bit, . . . , the 31st bit, and the 32nd bit. The five-bit De Bruijn sequences include $2^{[2^{(5-1)}-5]}=2048$ different De Bruijn sequences. Take Table 3 as an example. Table 3 shows 64 five-bit De Bruijn sequences. FIGS. 9(*a*)-9(*c*) are diagrams illustrating Table 3. FIGS. 9(*a*)-9(*c*) belong to the same table. From Table 3, it is known that 11111 and 00000 are located in the diagonal positions of the rotary coding disc 20.

According to Table 2 and Table 3, when a binary code with a length of M bits is located between the maximum binary code and the minimum binary code, the corresponding N-bit De Bruijn sequences are selected as diagonal De Bruijn sequences. M is a positive integer, and $$\frac{2^N-2N}{2}-\frac{N}{2}<M<\frac{2^N-2N}{2}+\frac{N}{2}.$$

Table 2 shows the diagonal De Bruijn sequence. Finally, the positions of the plurality of transparent areas and the plurality of opaque areas of the rotary coding disc 20 are arranged based on the diagonal De Bruijn sequences. For example, the positions of 1 and 0 of the diagonal De Bruijn sequence respectively correspond to the positions of the transparent area and the opaque area. The transparent areas and the opaque areas may be circularly distributed.

In order to further reduce the variation of the voltage level of the periodic signal, the following steps may be performed after selecting the diagonal De Bruijn sequences.

The first number of each bit of the diagonal De Bruijn sequence is added to the second numbers of (N−1) bits consecutively neighboring the first number to obtain the value of the energy level. The value of the energy level replaces the corresponding first number to convert the diagonal De Bruijn sequence into a De Bruijn energy level. The De Bruijn energy level includes the value of the energy level. The value of the energy level is a non-negative integer less than or equal to N. Take N=5 as an example. FIGS. 10(*a*)-10(*c*) are diagrams illustrating Table 4. FIGS. 10(*a*)-10(*c*) belong to the same table. Table 4 shows the De Bruijn energy level. Take the first diagonal De Bruijn sequence in Table 3 as an example. The first number of the third bit is 0. The second numbers of four bits, being located at the left and right sides of the first number of the third bit and consecutively neighboring the first number of the third bit, are 0. Thus, the corresponding value of the energy level is 0. Alternatively, the second numbers of four bits, being located at the right side of the first number of the third bit and consecutively neighboring the first number of the third bit, are 0, 0, 1, and 0. Thus, the corresponding value of the energy level is 1. All the diagonal De Bruijn sequences are converted into the De Bruijn energy levels based on the same rule. In addition, if the second numbers of four bits being located at the left side of the first number of the first bit and consecutively neighboring the first number of the first bit are selected, the second numbers of the 29th, the 30th, the 31st, and 32nd bits are selected. This is because the De Bruijn sequence is a cyclic sequence. The 32nd bit neighbors the first bit.

Figure 11:
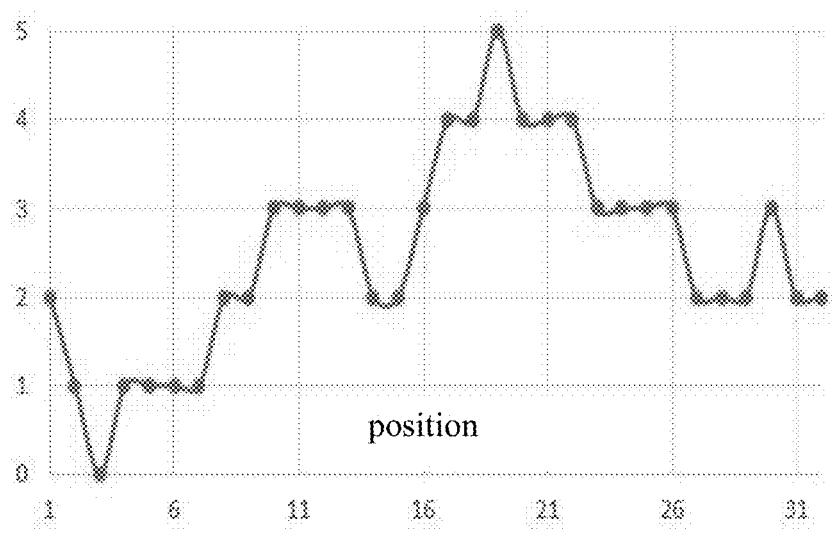
FIG. 11 is a diagram schematically illustrating the energy levels of five-bit De Bruijn sequences of the present invention.
Figure 11:
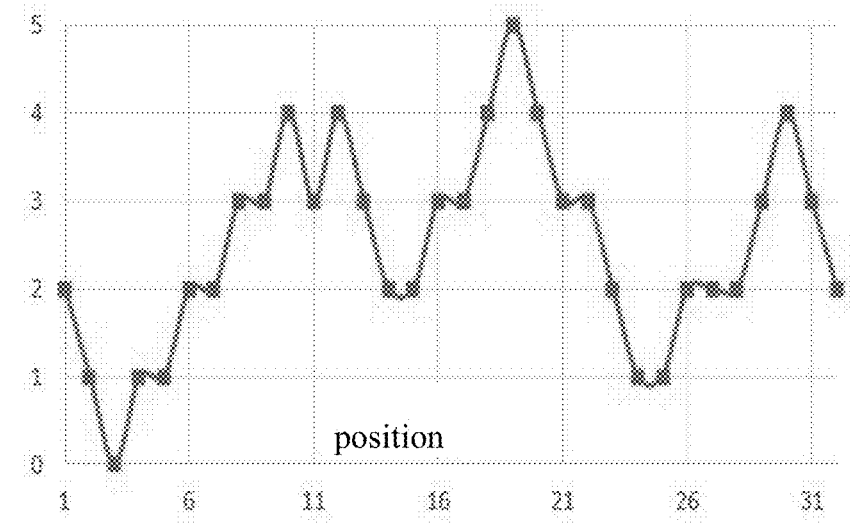

In Table 4, the rightmost column represents the total number of 1 consecutively neighboring 0 and (N−1) consecutively neighboring N of the De Bruijn energy level. The fourth De Bruijn energy level corresponds to the highest total number. The 25$^{th}$ De Bruijn energy level corresponds to the lowest total number. FIG. 11 is a diagram schematically illustrating the energy levels of the fourth and 25$^{th}$ De Bruijn energy levels of the present invention. From FIG. 11, it is known that the value of the energy level of the 25$^{th}$ De Bruijn energy level more frequently varies but has small variations. In the conventional technology, the value of the energy level of the De Bruijn energy level has a higher variation such that the voltage signal suddenly drops, which is different from the 25$^{th}$ De Bruijn energy level. As a result, the total number of 1 consecutively neighboring 0 and (N−1) consecutively neighboring N of the De Bruijn energy level is calculated. The positions of the plurality of transparent areas and the plurality of opaque areas are arranged based on the De Bruijn energy level that corresponds to the total number less than or equal to N.

According to the embodiments provided above, the maximum binary code and the minimum binary code of the De Bruijn sequence are located in the diagonal positions of the rotary coding disc in order to effectively reduce the variation of the voltage level of a periodic signal and the burden of the processing circuit in the back end.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A rotary coding disc, applied to an optical encoder, comprising:
   a plurality of transparent areas; and
   a plurality of opaque areas;
   wherein the plurality of transparent areas and the plurality of opaque areas are circularly distributed;
   wherein the number of N-bit De Bruijn sequences is $2^{[2^{(N-1)}-N]}$, the N-bit De Bruijn sequences include 1 and 0, N is a natural number larger than or equal to 3, and each of the N-bit De Bruijn sequences has a length of $2^N$, a maximum binary, code with a length of N bits, and a minimum binary code with a length of N bits;
   wherein when a binary code with a length of M bits is located between the maximum binary code and the minimum binary code, the corresponding N-bit De Bruijn sequences are selected as diagonal De Bruijn sequences, M is a positive integer, and $$\frac{2^N-2N}{2}-\frac{N}{2}<M<\frac{2^N-2N}{2}+\frac{N}{2};$$

wherein positions of the plurality of transparent areas and the plurality of opaque areas are arranged based on the diagonal De Bruijn sequences.

2. The rotary coding disc according to claim 1, wherein a first number of each bit of the diagonal De Bruijn sequence is added to second numbers of (N−1) bits consecutively neighboring the first number to obtain a value of an energy level, the value of the energy level replaces a corresponding the first number to convert the De Bruijn sequence into a De Bruijn energy level, the De Bruijn energy level includes the value of the energy level, the value of the energy level is a non-negative integer less than or equal to N, the total number of 1 consecutively neighboring 0 and (N−1) consecutively neighboring N of the De Bruijn energy level is calculated, and the positions of the plurality of transparent areas and the plurality of opaque areas are arranged based on the De Bruijn energy level that corresponds to the total number less than or equal to N.

3. The rotary coding disc according to claim 1, wherein positions of 1 and 0 of the diagonal De Bruijn sequence respectively correspond to the positions of each of the plurality of transparent areas and each of the plurality of opaque areas.

4. The rotary coding disc according to claim 1, wherein positions of 0 and 1 of the diagonal De Bruijn sequence respectively correspond to the positions of each of the plurality of transparent areas and each of the plurality of opaque areas.

5. The rotary coding disc according to claim 1, wherein a number of each bit of the maximum binary code is 1 and a number of each bit of the minimum binary code is 0.

6. A method for designing a rotary coding disc, applied to an optical encoder with transparent areas and opaque areas, comprising:
  forming N-bit De Bruijn sequences with 1 and 0, wherein the number of the N-bit De Bruijn sequences is $2^{[2^{(N-1)}-N]}$, N is a natural number larger than or equal to 3, and each of the N-bit De Bruijn sequences has a length of $2^N$, a maximum binary code with a length of N bits, and a minimum binary code with a length of N bits;
  when a binary code with a length of M bits is located between the maximum binary code and the minimum binary code, the corresponding N-bit De Bruijn sequences are selected as diagonal De Bruijn sequences, M is a positive integer, and $$\frac{2^N - 2N}{2} - \frac{N}{2} < M < \frac{2^N - 2N}{2} + \frac{N}{2};$$

and arranging positions of the transparent areas and the opaque areas based on the diagonal De Bruijn sequences, wherein the transparent areas and the opaque areas are circularly distributed.

7. The method for designing a rotary coding disc according to claim 6, wherein after the step of selecting the diagonal De Bruijn sequences, the method further comprising:
  adding a first number of each bit of the diagonal De Bruijn sequence to second numbers of (N−1) bits consecutively neighboring the first number to obtain a value of an energy level, and replacing a corresponding the first number with the value of the energy level to convert the diagonal De Bruijn sequence into a De Bruijn energy level, wherein the De Bruijn energy level includes the value of the energy level, and the value of the energy level is a non-negative integer less than or equal to N; and
  calculating a total number of 1 consecutively neighboring 0 and (N−1) consecutively neighboring N of the De Bruijn energy level, and arranging the positions of the transparent areas and the opaque areas based on the De Bruijn energy level that corresponds to the total number less than or equal to N.

8. The method for designing a rotary coding disc according to claim 6, wherein positions of 1 and 0 of the diagonal De Bruijn sequence respectively correspond to the positions of the transparent area and the opaque area.

9. The method for designing a rotary coding disc according to claim 6, wherein positions of 0 and 1 of the diagonal De Bruijn sequence respectively correspond to the positions of the transparent area and the opaque area.

10. The method for designing a rotary coding disc according to claim 6, wherein a number of each bit of the maximum binary code is 1 and a number of each bit of the minimum binary code is 0.

\* \* \* \* \*